Figure 1:
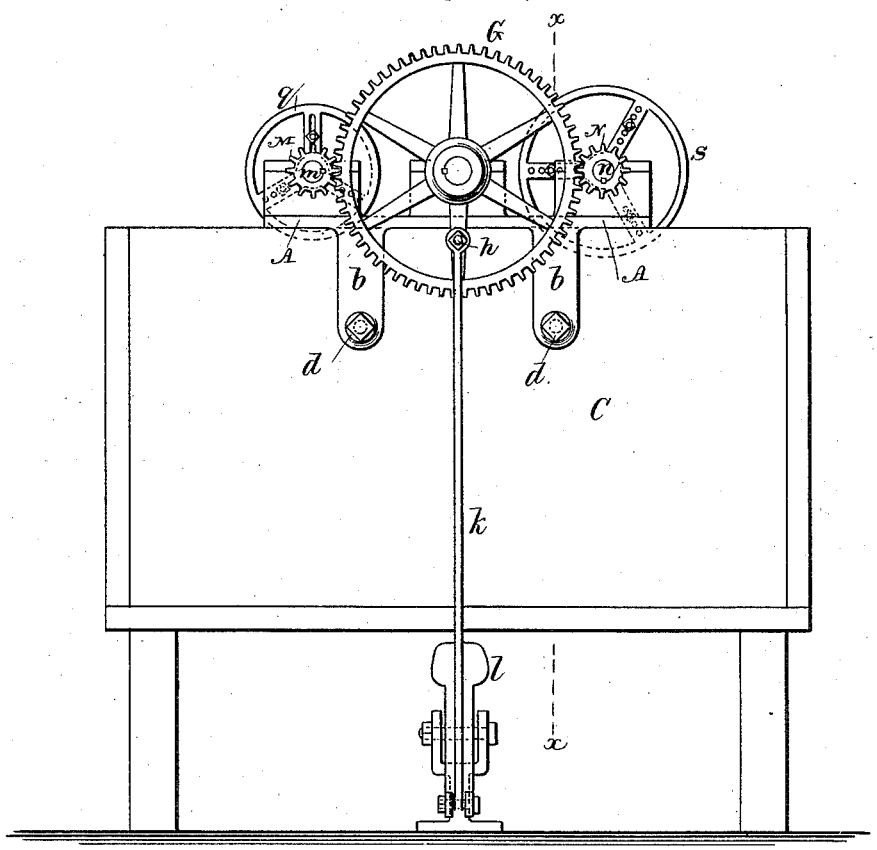

(No Model.)  2 Sheets—Sheet 1.

R. LEWIS.
MACHINE FOR WASHING FLOWER POTS.

No. 344,842.  Patented July 6, 1886.

Witnesses
Chas H Smith
J. Staib

Inventor
Richard Lewis
for Lemuel W. Serrell
atty (No Model.)  2 Sheets—Sheet 2.
R. LEWIS.
MACHINE FOR WASHING FLOWER POTS.
No. 344,842.  Patented July 6, 1886.
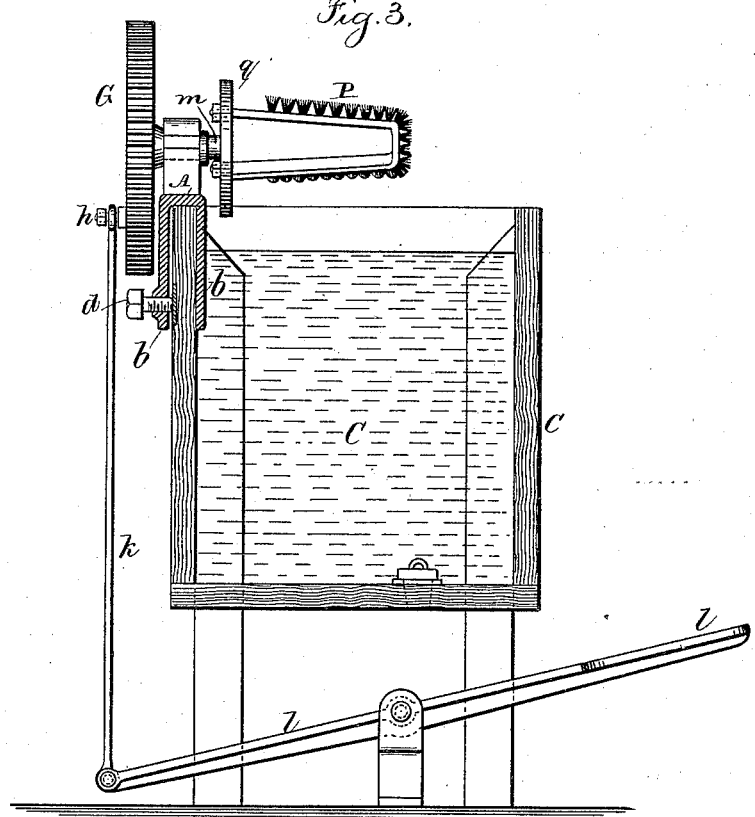
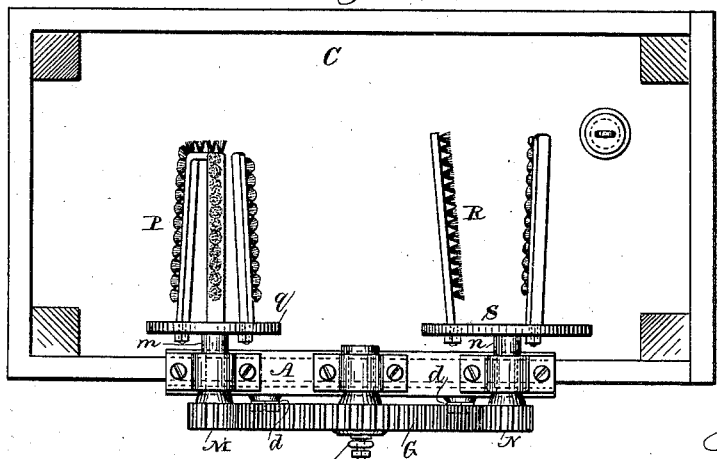
Witnesses
Chas. H. Smith
J. Staib
Inventor
Richard Lewis
for Lemuel W. Serrell
atty
N. PETERS, Photo-Lithographer, Washington, D. C.

UNITED STATES PATENT OFFICE.

RICHARD LEWIS, OF NEWPORT, RHODE ISLAND.

MACHINE FOR WASHING FLOWER-POTS.

SPECIFICATION forming part of Letters Patent No. 344,842, dated July 6, 1886.

Application filed April 1, 1885. Serial No. 160,869. (No model.)

*To all whom it may concern:*

Be it known that I, RICHARD LEWIS, of Newport, in the county of Newport and State of Rhode Island, have invented an Improvement in Machines for Washing Flower-Pots, of which the following is a specification.

Flower-pots that are used by florists and others generally become covered with a green mold, and it is advantageous to wash the pots after the plants have been removed from them and before they are used a second time. This has generally been done by hand; but it is a tedious and expensive operation, because a scrubbing-brush generally has to be made use of in cleaning both the inside and the outside.

By my improvement I am able to make use of power—such as hand, foot, or steam—in scrubbing and cleaning the pots, and to do the work very much easier and more thoroughly than heretofore. I prefer to make my mechanism movable, so that the same can be applied upon the edge of a box or other receptacle for water, or removed therefrom when not in use.

In the drawings, Figure 1 is a rear view of the box and gearing. Fig. 2 is a plan view; and Fig. 3 is a cross-section at the line $x\ x$.

I make use of a frame, A, having side pieces or clips, $b$, descending below its edges, and adapted to pass at each side of the top edge of a box, C; and $d\ d$ are clamp screws or fastenings going through the clips D, so as to secure the frame to the box or allow of its removal. Upon this frame A there is a gudgeon, upon which is received the hub of the gear-wheel G, and from one of the arms of this wheel a crank-pin, $h$, projects, and receives the connecting-rod $k$, that extends to a treadle, $l$, passing across beneath the box C, and sustained by a pivot that is either fastened to the under side of the box or rests upon the floor, so that the wheel G can be easily rotated by foot-power. Steam or any other suitable power may be employed.

M N are pinions upon shafts $m\ n$, going through boxes or bearings cast upon the frame A. These gear-wheels M N are at opposite edges of the gear-wheel G, and are rotated thereby, and upon these shafts $m\ n$ are the brushes made use of in cleaning the pots.

The brush P, that is used for cleaning the inside of the pot, is upon the shaft $m$, and the shape of this brush is tapering, corresponding generally with the interior of the flower-pot, and the bristles of the brush extend outwardly. These brushes P are usually made upon separate arms having screw-shanks at the ends adapted to pass through holes in the disk or wheel $q$, and be secured by nuts. In this disk $q$ are numerous holes or radial slots extending from the center, so that the brushes can be moved as required from time to time to suit pots of different sizes. For small pots, however, the interior cleaning-brush, P, may be upon a solid head or tapering block that is movable from the shaft $m$, and can be changed according to the size of the pots to be operated upon.

The brush R, that is employed for cleaning the outside of the pot, is made by three or more separate arms that diverge at an angle corresponding generally to the inclined outer surfaces of the flower-pots, and the bristles project inwardly upon the arms. These arms are usually provided with screw-shanks at the inner ends, passing through slots or holes in the disk or wheel S, and such arms are secured in place by nuts, and can be removed, as necessary, from time to time in adapting the machine to pots of different sizes.

The box C is to be nearly filled with water, and there should be a plug in the bottom to allow the dirty water to be discharged when necessary. The pots are to be assorted in sizes, as usual, and the brushes placed so as to be adapted to the size of the pots to be operated upon. A number of pots will usually be placed in the box C and allowed to soak a sufficient length of time to facilitate the washing operations, after which the attendant revolves the brushes by the treadle $l$ and gearing, and the pots are handled successively and placed upon the revolving brush P, for cleaning the inside, and then reversed and held within the revolving brushes R by means of a holder or handle inserted into the pot, for cleaning the outside of such pot. This is done very rapidly, and the pots are thoroughly cleansed by the brushing and rinsing in the water in the box C.

I do not claim two concentric brushes—one to act on the outside of an article and the other on the inside—as these have been used; but they are not adapted to articles that vary in size, such as flower-pots. Neither do I claim three brushes side by side in a water-vessel.

I claim as my invention—

1. A box for containing water, and a frame adapted to be attached to such box, in combination with a driving-wheel and a gudgeon on the frame for supporting the same, two shafts and pinions, one at each side of the driving-wheel, and two brushes upon the respective shafts, one adapted to clean the inside of the flower-pot and the other the outside, substantially as specified.

2. The frame A and clip-pieces b, by which the frame and parts are removably connected to a box, in combination with the gear-wheel G, treadle, connecting-rod, and crank for rotating the same, the gear-wheels M N, and the brushes P R, rotated by such gear-wheels, substantially as set forth.

Signed by me this 18th day of March, A. D. 1885.

RICHARD LEWIS.

Witnesses:
THOMAS P. PECKHAM,
ROBERT McINTOSH.